Figure 4:
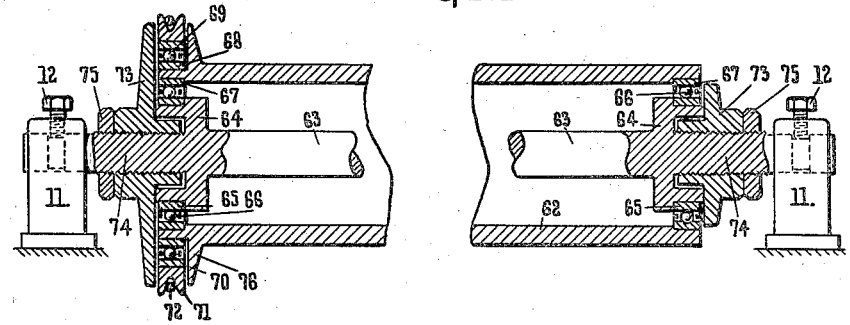

Jan. 14, 1936.  J. H. ROONEY ET AL  2,027,451
MEANS FOR CONVEYING MATERIALS IN THE FORM OF LONG WEBS OR SHEETS
Filed April 6, 1934   2 Sheets-Sheet 1
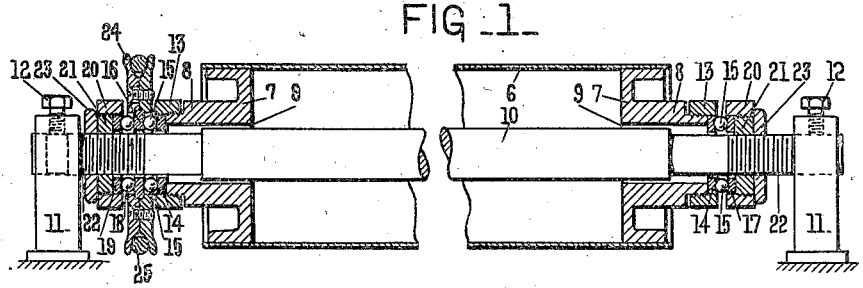
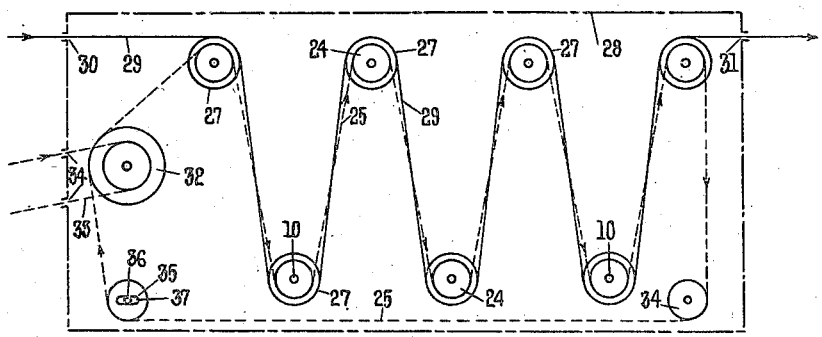
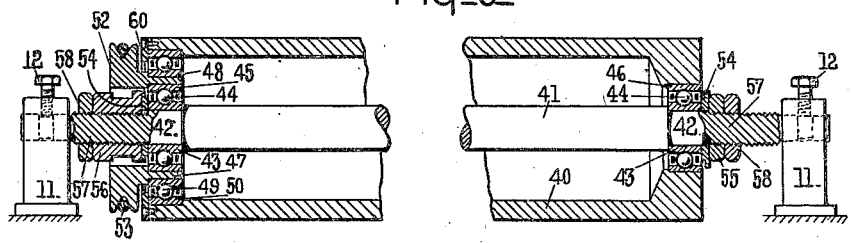
Inventors
J. H. Rooney.
R. J. Ward
by
Attorneys Patented Jan. 14, 1936

2,027,451

UNITED STATES PATENT OFFICE 2,027,451

MEANS FOR CONVEYING MATERIALS IN THE FORM OF LONG WEBS OR SHEETS

James Henry Rooney and Robert Jabez Ward, Spondon, near Derby, England, assignors to Celanese Corporation of America, a corporation of Delaware Application April 6, 1934, Serial No. 719,420
In Great Britain April 26, 1933

8 Claims. (Cl. 308—20)

This invention relates to conveying mechanism and more particularly to means for conveying materials in the form of long webs or sheets progressively from one point to another. The type of apparatus with which the invention is concerned comprises one or more rollers or rotatable cylinders which are placed between the points of reception and delivery of the material, so as to support and guide the material.

Depending on the strength of the material and upon the distance it is being conveyed, the conveying rollers of such apparatus are either driven by power at a predetermined speed, or rotated by the pull of the material as it is drawn through the apparatus by means such as a take-up beam or roller.

While the above methods may be found suitable for conveying material in a relatively strong or not easily damaged condition, it is often necessary to convey material in a partially processed or softened state which makes it most undesirable to pull the material over idle rollers, while, on the other hand, unevenness of tension or slipping caused, for example, by wrong adjustment of the speeds of driven conveying rollers, may have detrimental results, and may lead to flaws in the finished article. As examples of materials which are required to be conveyed while in a softened condition may be mentioned fine papers, foils, films, and delicate textile threads or fabrics, which, after undergoing forming or wetting treatments, are frequently conveyed to and through drying or other treating apparatus while in relatively weak or frail condition.

Foils in particular are liable to damage as by creasing, breaking, or scratching of their surface, while being conveyed during any process in which the length of the material tends to alter. Thus in the final drying, for example, of cellulose acetate or other cellulose derivative foil after it has left the drum, band, or other apparatus on which it has been formed, the consequent removal of solvent tends to shrink the foil, while in an operation entailing the application of solvent or softening agent, the foil tends to elongate. The rate of change of length may vary considerably from end to end of the conveying run, and may cause a relatively considerable difference in the length of the material fed into and delivered from the treating apparatus. While the change in length may be progressive throughout the treatment, such change is not necessarily uniform and it is therefore a matter of very great difficulty to adjust the speed of the conveying rollers in any particular operation exactly to the rate of progress of the material at each roller.

The object of the invention is to provide a conveying apparatus of the type mentioned in which the conveying rate is automatically adjusted in accordance with the rate of delivery of the material, without applying undue strain to the material.

With this object in view the conveying apparatus according to the invention comprises at least one roller or rotatable conveying element adapted to support the material to be conveyed and driven in non-positive manner so that the peripheral speed can automatically adjust itself to the rate at which the material is delivered to the roller or the like.

Such non-positive drive is transmitted to the roller or rollers by means of a driving member co-operating with a driven member through sensitive driving means which permits slip to occur so that the driven member can adjust itself to the speed of the material, any excess movement of the driving member resulting in slip. Ball or roller bearings provide a particularly sensitive drive which will permit slip without back-lash and which can readily be adjusted in accordance with the power to be transmitted and the slippage desired. Conveniently the driving arrangement incorporates a fixed member between which and the driving and driven members the ball or roller races are inserted to increase its sensitivity. Other forms of non-positive drive may be used, such as an induction motor, or fluid means, e. g. a fluid clutch.

Each roller should be of light construction, e. g. a thin cylindrical body mounted on end plates. The sensitive drive may be applied at both ends of the roller, but more conveniently the roller is driven at one end only and supported at the other by a light bearing.

The apparatus according to the invention is particularly suitable for conveying film or foil, and especially while the film or foil is in soft or partly processed condition. In order to avoid strain or extension, with resultant scratching of such soft material, an accurate drive is necessary and owing to the non-uniformity of the change in length of foil, a theoretical setting is, as previously mentioned, difficult if not impossible to maintain over a reasonable period. Such a setting requires accurate adjustment of roller speeds and/or diameters. At the same time, while belt gearing would have to be avoided because of variable slip, positive gear drives are unsuitable because of back-lash. Further, even if such accurate setting is achieved for a particular type or thickness of foil, a change in the foil or even in the treating conditions would render the setting unsuitable.

The invention, however, enables the slightest variation in the rate of progress of the material to control automatically the rate of rotation of the conveying rollers, the material thus being passed along the conveying run at a proper speed and delivered to the ultimate point uncreased and unscratched, while the apparatus is readily adjustable for changes in working conditions.

In the case of foil drying mechanism the newly formed material is delivered from the casting surface by a feed or stripping roller which can be adapted to drive a series of conveying rollers at approximately the speed at which the foil leaves the feed roller, the non-positive drive of the conveying rollers automatically adjusting itself at each roller to any change in speed due to variation in the length of the foil as it passes through the conveying run.

Figure 5:
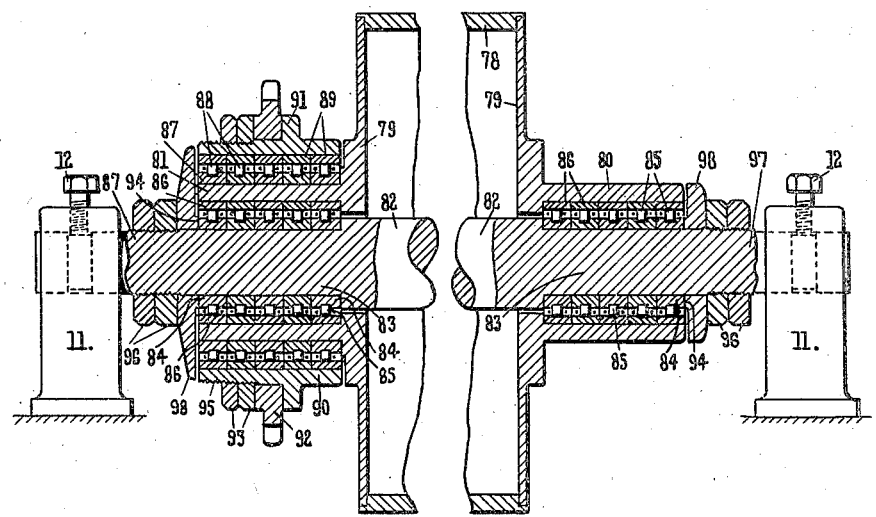

Some forms of apparatus according to the invention will now be described in greater detail with reference to the accompanying drawings, in which Figure 1 shows in part cross-sectional elevation a conveying roller and associated driving means, Figure 2 is a diagrammatic representation of a drying apparatus, while Figures 3, 4 and 5 show in part cross-sectional elevation other forms of conveying rollers and associated driving means.

Referring to Figure 1, the roller comprises a thin cylindrical body 6, e. g. of sheet metal, mounted on hubs 7 which are formed with extensions 8 and are centrally bored at 9. The roller is arranged co-axially about, but not in contact with, a central shaft 10 which is supported at its extremities by short pillars 11 in which the shaft is secured against rotation by screws 12.

Flanged nuts 13 secure flat, ring-like ball-races 14 to the ends of the hub extensions 8. Trains of balls 15 are held between the races 14 and further races 16, 17, respectively, the race 16 at the left-hand end being double-sided in order to accommodate a further train of balls 18 which are held against it by a further race 19. The ball races 17, 19 are secured by flanged nuts 20 to nuts 21 screwed on threaded portions 22 of the shaft 10 and locked in position by lock nuts 23. A rope pulley 24 driven by a rope 25 is secured round the race 16.

The roller being of light construction and being mounted on ball bearings, it can be very easily rotated by the torque transmitted through the balls 15 from the race 16 carrying the driving pulley 24. The roller will thus continue to rotate as long as the resistance to rotation caused by the material being conveyed does not exceed the torque capable of being transmitted through the balls 15. Any difference between the speed at which the material is delivered to the roller and the greater speed at which the pulley 24 is attempting to drive the roller is taken up in the bearing constituted by the races 14, 16 and the balls 15.

If the material being conveyed is retarded, however, the roller will immediately adjust itself to the reduced rate of delivery of the material, while the pulley 24 continues to rotate the race 16 at the usual rate. Even if the delivery of the material should stop completely, the roller would cease rotating while the pulley 24 and race 16 would continue to rotate at the usual rate. The drive of the pulley 24 is such that the conveying roller tends to be driven at a rate slightly in excess of the maximum rate of delivery of the material being conveyed so that any slack in the material caused, for example, at the commencement of the conveying operation, is taken up immediately, the drive then adjusting itself automatically to correct delivery speed.

In Figure 2, a plurality of conveying rollers 27 are shown mounted within a foil drying cabinet 28 in such a manner that the foil 29, which enters the cabinet through a slot 30, is conveyed to the exit 31 along a tortuous path so that as large a surface as possible of the foil is exposed to heat or other drying medium during its passage through the cabinet.

For convenience of illustration the pulleys 24 are shown as being of less diameter than the rollers 27. All the pulleys 24 are rotated by a common endless rope 25 (shown in dotted line in the drawings), which is driven by a pulley 32, the pulley 32 being driven in turn by a rope or chain 33, which enters and leaves the cabinet 28 through suitable openings 34 in the wall of the cabinet. The driving rope 25 is guided along the bottom of the cabinet 28 by guide pulleys 34, 35, the axle 36 of the guide pulley 35 being adjustable along the length of a slot 37 in order to allow of regulation of the tension in the rope.

The velocity of the driving rope 25 is such as to drive the first conveying roller touched by the newly formed foil at a peripheral speed substantially equal to the rate at which the foil is delivered from the casting surface or band (not shown), the rope 33 being driven from gear in connection with the usual stripping roller which takes the foil from the casting surface or band. In this manner the foil is taken up as quickly as it is delivered to the cabinet and the non-positive drive of the conveying rollers automatically adjusts itself at each roller to any change in speed due to variation in the length of the foil as it passes through the drying cabinet. The foil is therefore under constant control throughout the drying run, and is drawn along its path at the correct speed, and without undue strain at any point.

Individual adjustment of any roller may be effected by the nuts 21, 23 which enable the pressure on the balls 15, 18 to be regulated, and consequently the transmitted torque to be varied. The supporting pillars 11 may be dispensed with in the drying cabinet 28 and the central shafts 10 may be fixed in any suitable framework, or to the sides of the cabinet if desired. While in the apparatus shown in Figure 2, every roller 27 is driven by the rope 25, the drive may be transmitted to some of the rollers only, leaving one or more rollers to be rotated by the frictional contact of the foil passing thereover.

Figure 3 illustrates another form of conveying roller comprising a hollow cylindrical body 40 arranged co-axially about, but not in contact with a central shaft 41, which, as with the shaft 10 of Figure 1, is supported by short pillars 11 and secured therein against rotation by screws 12. The shaft 41 is formed with reduced portions 42 on which are fitted the inner races 43 of ball bearings 44. The outer race 45 of the bearing at the left hand end of the shaft is secured in a flat ring 47, while the race 46 of the other bearing fits directly into the roller 40. A ring 47 surrounds the race 45 and on it is secured the innner race 48 of a ball bearing 49, the outer race 50 of which is secured in the roller 40.

The flat ring 47 forms part of a rope pulley 52 driven by a rope 53. The pulley 52 rotates freely on the balls 44 and drives the roller 40 through the balls 49, much as the roller 6 of Figure 1 is driven from the pulley 24.

The races 43 are held on the shaft 41 by washers 54, nuts 55, 56 and lock nuts 58 which screw along the threaded portions 57 of the shaft 41. The outer race 50 of the bearing 49 is secured against end play by a circular plate 60 which is screwed into the end of the roller 40.

Figure 4 illustrates a conveying roller generally similar to that shown in Figure 3 but with a somewhat modified driving arrangement. The roller comprises a hollow cylindrical body 62 which is arranged co-axially about, but not in contact with a central shaft 63, which, as described with reference to Figures 1 and 3, is supported by short pillars 11, in which it is secured against rotation by screws 12. The shaft 63 is formed towards its extremities with enlarged circular portions 64 on to which are tightly fitted ball races 65. The races 65 are surrounded by trains of balls 66 which are encircled by ball races 67 and which fit tightly into the ends of the roller 62.

The outer periphery of the left-hand end of the roller 62 is encircled by a further ball-race 68 which is surrounded by a train of balls 69, the balls being encircled in turn by a race 70 to which is secured a rope pulley 71. The pulley 71 is driven by a rope 72 and so imparts a sensitive driving torque to the roller 62 through the balls 69, the roller turning freely on the balls 66. The bearings 66, 69 are protected on the outside by flanged nuts 73 which screw along threaded portions 74 of the shaft 63 and contact with the enlarged portions 64. The nuts 73 are locked in position on the shaft 63 by lock nuts 75. The inside of the left-hand, or driving, bearing 69 is protected by a flange 76 formed on the roller 62.

For heavier work, i. e. for rollers which are required to convey a relatively heavy material, and which as a consequence require a greater applied torque, the roller illustrated in Figure 5 may be used. As shown in the figure the roller comprises a light cylindrical body 78 which is mounted on end plates 79. The plates 79 are formed with outstanding cylindrical hubs 80, 81 which are bored centrally, and are arranged co-axially about, but not in contact with a central shaft 82, which, as explained with reference to Figures 1, 3 and 4, is supported by short pillars 11 in which it is secured against rotation by screws 12.

The shaft 82 is formed with reduced portions 83 which are encircled by roller races 84 (five races being shown at each extremity of the shaft). The races 84 are surrounded by trains of rollers 85 which are encircled by further races 86 adapted to fit against the inside peripheries of the cylindrical hubs 80, 81. The hub 81 is encircle by a further series of roller races 87 which are surrounded by trains of rollers 88, the rollers 88 being encircled by a series of further races 89 which fit tightly against the inside periphery of a cylindrical sheath 90. The sheath 90 is formed with an annular shoulder 91 to which a chain sprocket-ring 92 is securely held by nuts 93 which screw along the threaded extremity 95 of the sheath 90.

On rotation of the sprocket ring 92 by the driving chain (not shown), the sprocket 92, the sheath 90 and the roller races 89 rotate as a single unit and impart rolling motion to the roller trains. The rotation of the roller train 88 transmits a frictional torque to the races 87 and consequently to the roller 78 which is thus rotated by the friction between the races 89 and the rollers 88. The left- and right-hand ends of the roller are protected by flanged guards 98 which are formed with raised annular surfaces 94 around their central bores so as to hold the races 84 in position on the central shaft 82. End play of the races 84 is thus prevented, and the guards 98 are maintained in fixed position by nuts 96 which screw along threaded portions 97 of the central shaft.

If desired, the races 84, 86 and 87, 89 may be modified to accommodate balls instead of rollers. Similarly, the races of the ball-bearings shown in Figures 3 and 4 may be modified to accommodate rollers instead of balls, or if desired, the driving end of the rollers may be equipped with ball bearings, while the other end may ride on rollers, or vice versa. The dimensions of the sets of balls or rollers may be varied in accordance with the class of work for which the rollers are used.

While the conveying rollers according to the invention have been described more particularly as being rope- or chain-driven, driving belts or gearing of any type may be used. In order to keep the inertia of the rollers as small as possible, the rollers are preferably made of light metals, or other materials not likely to be affected by the nature of the material being conveyed, or by the conditions under which the material is conveyed.

What we claim and desire to secure by Letters Patent is:—

1. In apparatus for conveying material in the form of long webs or sheets, a freely rotatable roller adapted to forward the material, a rotatable driving member arranged co-axially with said roller, and a plurality of rolling members interposed between said driving member and said roller, and adapted on rotation of said driving member to roll and thereby to provide for the transmission of a non-positive drive to said roller so as to permit the peripheral speed of the roller to adjust itself automatically to the rate at which the material is delivered to the roller.

2. In apparatus for conveying material in the form of long webs or sheets, a freely rotatable roller adapted to forward the material, rotatable means for driving said roller, and a roller bearing interposed between the roller and the driving means so as to transmit the drive from said driving means to said roller by rolling action in a non-positive manner and permit the peripheral speed of the roller to adjust itself automatically to the rate at which the material is delivered to the roller.

3. In apparatus for conveying material in the form of long webs or sheets, a freely rotatable roller adapted to forward the material, rotatable means for driving said roller, and a ball bearing interposed between the roller and the driving means so as to transmit the drive from said driving means to said roller by rolling action in a non-positive manner and permit the peripheral speed of the roller to adjust itself automatically to the rate at which the material is delivered to the roller.

4. In apparatus for conveying material in the form of long webs or sheets, a freely rotatable roller element adapted to forward the material, a rotatable driving element for said roller disposed co-axially therewith, a support for one of said elements, a plurality of rolling members interposed between said support and the element supported thereby and permitting free rotation of the element, and a plurality of rolling members interposed between said elements to allow one element to support the other rotatably while providing for the transmission of a non-positive drive from said driving element to said roller element by the rolling action of said members and thereby permitting the peripheral speed of said roller element to adjust itself automatically to the rate at which the material is delivered thereto.

5. In apparatus for conveying material in the form of long webs or sheets, a freely rotatable roller adapted to forward the material, rotatable driving means for said roller disposed co-axially therewith, a support for said driving means and said roller, sets of ball bearings interposed respectively between said driving means and said roller, and between said driving means and said support to provide for free rotation of said driving means and said roller, the set between the driving means and the roller transmitting by rolling action a non-positive drive from said driving means to said roller so as to permit the peripheral speed of the roller to adjust itself automatically to the rate at which the material is delivered to the roller.

6. In apparatus for conveying material in the form of long webs or sheets, a roller adapted to forward the material, supports for said roller at each end thereof, an annular ball-race on each end of said roller and on each support, a double-sided ball-race interposed between at least one end of said roller and the corresponding support, sets of ball bearings between the races of the roller and the support at one end of the roller and between the roller and the double race and the support and the double race at the other end of said roller, and means for rotating said double race so as to transmit a non-positive torque to said roller by rolling the balls between the double race and the roller.

7. Apparatus according to claim 6 comprising means for adjusting the pressure of the races on the ball bearings.

8. A foil-drying cabinet comprising as foil conveying means at least one freely rotatable roller adapted to forward the foil, a rotatable driving member arranged coaxially with said roller, and a plurality of rolling members interposed between said driving member and said roller and adapted on rotation of said driving member to roll and thereby to provide for the transmission of a non-positive drive to said roller so as to permit the peripheral speed of the roller to adjust itself automatically to the rate at which the foil is delivered to the roller.

JAMES HENRY ROONEY.
ROBERT JABEZ WARD.